US012647873B2

(12) United States Patent
Lu et al.

(10) Patent No.: US 12,647,873 B2
(45) Date of Patent: Jun. 2, 2026

(54) METHOD AND APPARATUS FOR SERVICE HANDLING

(71) Applicant: Telefonaktiebolaget LM Ericsson (publ), Stockholm (SE)

(72) Inventors: Yunjie Lu, Shanghai (CN); Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 345 days.

(21) Appl. No.: 18/547,614

(22) PCT Filed: Jun. 22, 2022

(86) PCT No.: PCT/CN2022/100451
§ 371 (c)(1),
(2) Date: Aug. 23, 2023

(87) PCT Pub. No.: WO2023/273986
PCT Pub. Date: Jan. 5, 2023

(65) Prior Publication Data
US 2024/0073786 A1      Feb. 29, 2024

(51) Int. Cl.
*H04W 48/04* (2009.01)
*H04W 36/00* (2009.01)
(52) U.S. Cl.
CPC ........ *H04W 48/04* (2013.01); *H04W 36/0011* (2013.01)
(58) Field of Classification Search
CPC ........................ H04W 48/04; H04W 36/0011
(Continued)

(56) References Cited

U.S. PATENT DOCUMENTS

2021/0306203 A1* 9/2021 Landais ................. H04L 67/02
2022/0120741 A1   4/2022 Ren et al.
2023/0254381 A1* 8/2023 Rodrigo ................. H04L 67/51
                                                      709/224

FOREIGN PATENT DOCUMENTS

JP      2023550688 A   12/2023
WO   2021047551 A1    3/2021
WO   2021083926 A1    5/2021

OTHER PUBLICATIONS

"DISC on Retransmission of requests with indirect communications", 3GPP TSG-CT WG4 Meeting #104-e, C4-213090, E-Meeting, May 19-28, 2021, pp. 1-3.
(Continued)

*Primary Examiner* — Chuck Huynh
(74) *Attorney, Agent, or Firm* — Murphy, Bilak & Homiller, PLLC

(57) ABSTRACT

Embodiments of the present disclosure provide methods and apparatuses for service handling. A method performed by at a first network entity comprises send a first request targeting resource context or session context to a second network entity. The method further comprises receive a first rejection response from the second network entity or an alternative second network entity. The first rejection response includes information comprising a first parameter indicating whether the first request should be retried with the second network entity or to any other alternative second network entity and/or a second parameter indicating whether to use the alternative second network entity for a subsequent request targeting the same resource context or session context, wherein the first rejection response including information comprising the second parameter is received from the alternative second network entity.

21 Claims, 10 Drawing Sheets

(58) Field of Classification Search
USPC ........................................................ 455/418
See application file for complete search history.

(56)                      References Cited

OTHER PUBLICATIONS

"Indicating in error responses whether a request was retransmitted by SCP", 3GPP TSG-CT WG4 Meeting #104-e, C4-213091, E-Meeting, Revision of C4-212074, May 19-28, 2021, pp. 1-4.

"3GPP TS 23.501 V17.0.0", 3rd Generation Partnership Project; Technical Specification Group Services and System Aspects; System architecture for the 5G System (5GS); Stage 2, (Release 17), Mar. 2021, pp. 1-489.

"3GPP TS 23.502 V17.0.0", 3rd Generation Partnership Project; Technical Specification Group Services and System Aspects; Procedures for the 5G System (5GS); Stage 2 (Release 17), Mar. 2021, pp. 1-646.

"3GPP TS 29.500 V17.3.0", 3rd Generation Partnership Project; Technical Specification Group Core Network and Terminals; 5G System; Technical Realization of Service Based Architecture; Stage 3 (Release 17), Jun. 2021, pp. 1-108.

"3GPP TS 29.500 V17.2.0", 3rd Generation Partnership Project; Technical Specification Group Core Network and Terminals; 5G System; Technical Realization of Service Based Architecture; Stage 3 (Release 17), Mar. 2021, pp. 1-100.

* cited by examiner

Figure 2:
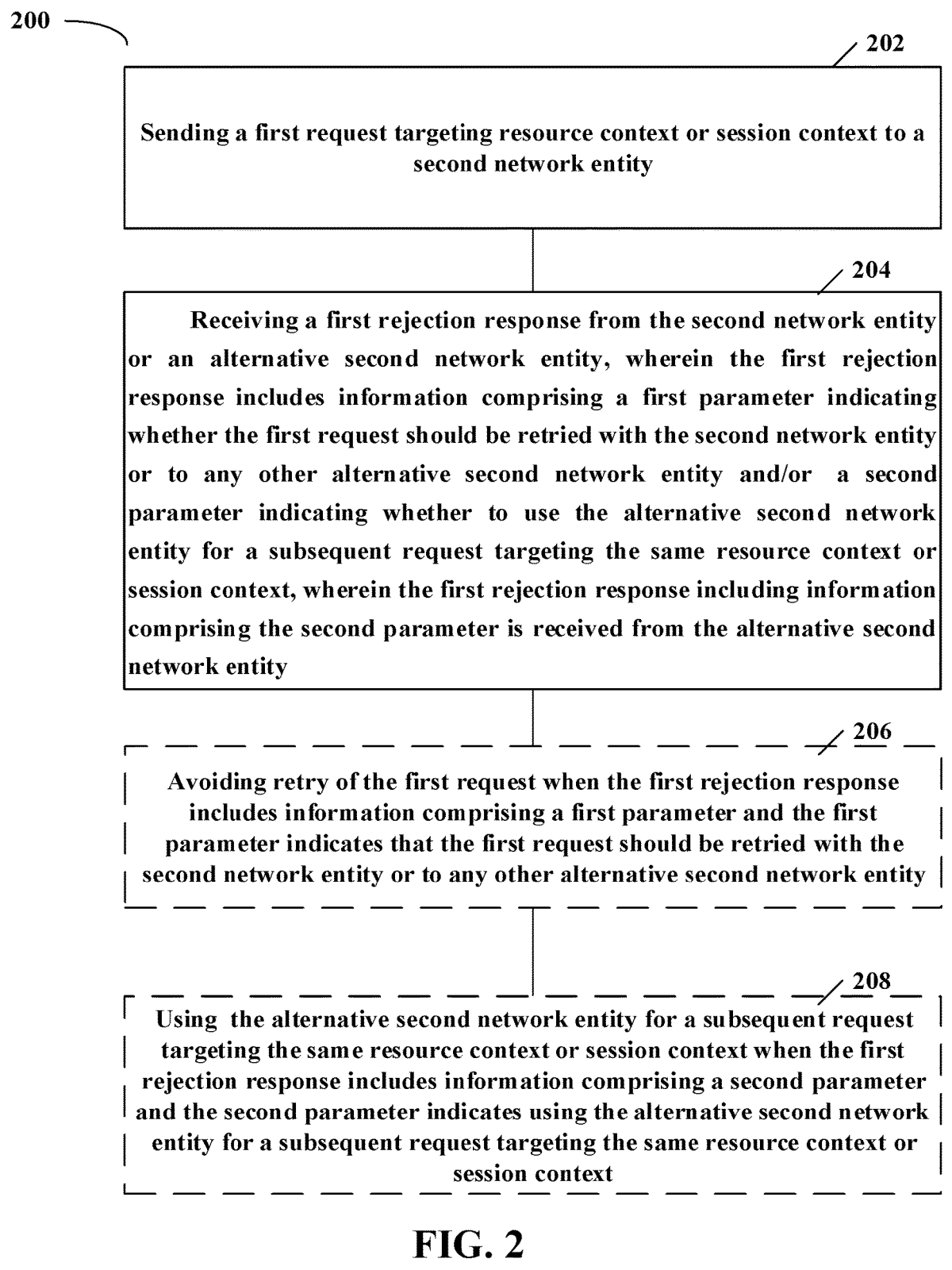

200

202

Sending a first request targeting resource context or session context to a second network entity

204

Receiving a first rejection response from the second network entity or an alternative second network entity, wherein the first rejection response includes information comprising a first parameter indicating whether the first request should be retried with the second network entity or to any other alternative second network entity and/or a second parameter indicating whether to use the alternative second network entity for a subsequent request targeting the same resource context or session context, wherein the first rejection response including information comprising the second parameter is received from the alternative second network entity

206

Avoiding retry of the first request when the first rejection response includes information comprising a first parameter and the first parameter indicates that the first request should be retried with the second network entity or to any other alternative second network entity

208

Using the alternative second network entity for a subsequent request targeting the same resource context or session context when the first rejection response includes information comprising a second parameter and the second parameter indicates using the alternative second network entity for a subsequent request targeting the same resource context or session context

Figure 3:
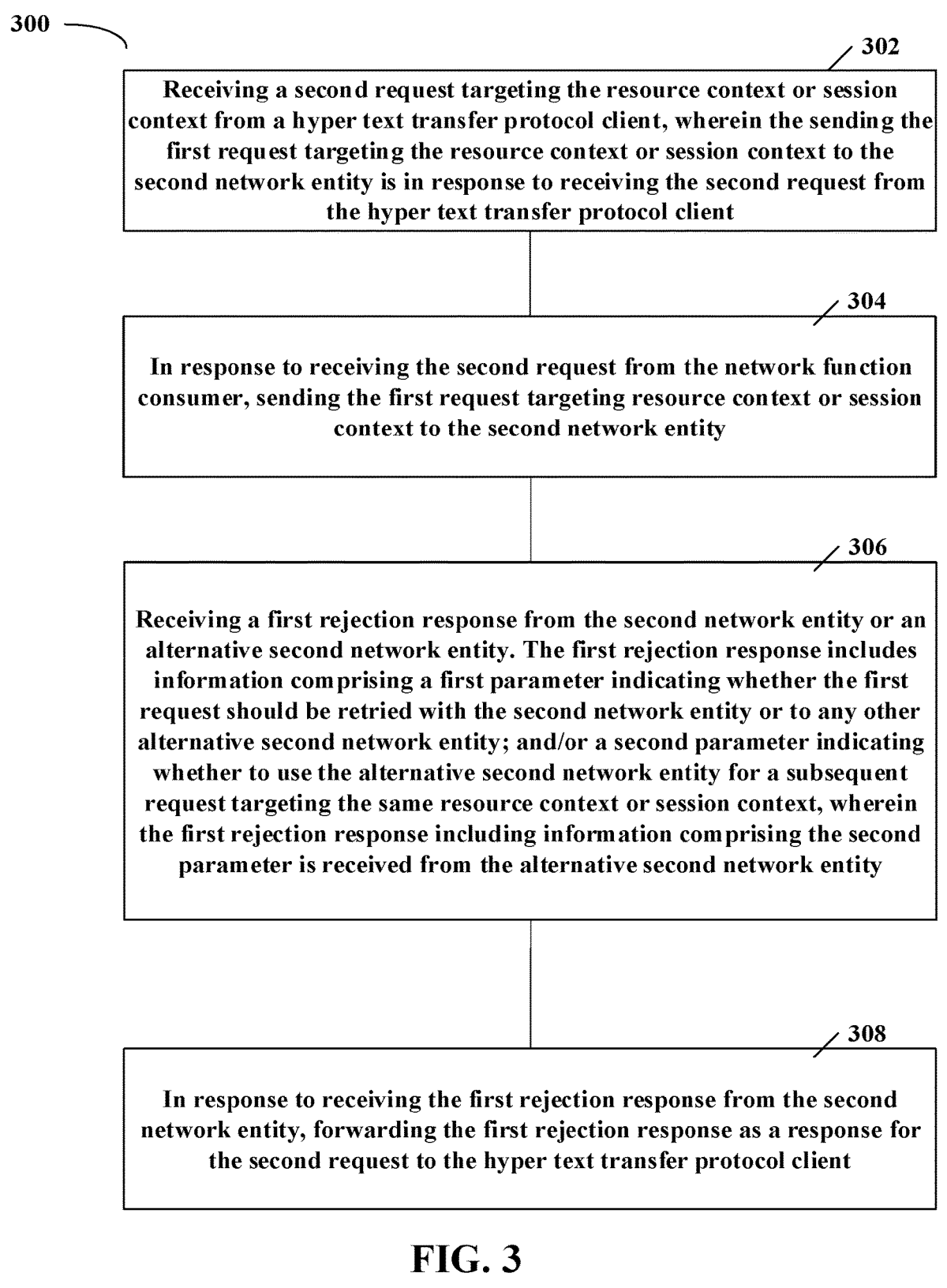

Receiving a second request targeting the resource context or session context from a hyper text transfer protocol client, wherein the sending the first request targeting the resource context or session context to the second network entity is in response to receiving the second request from the hyper text transfer protocol client

304

In response to receiving the second request from the network function consumer, sending the first request targeting resource context or session context to the second network entity

306

Receiving a first rejection response from the second network entity or an alternative second network entity. The first rejection response includes information comprising a first parameter indicating whether the first request should be retried with the second network entity or to any other alternative second network entity; and/or a second parameter indicating whether to use the alternative second network entity for a subsequent request targeting the same resource context or session context, wherein the first rejection response including information comprising the second parameter is received from the alternative second network entity

308

In response to receiving the first rejection response from the second network entity, forwarding the first rejection response as a response for the second request to the hyper text transfer protocol client

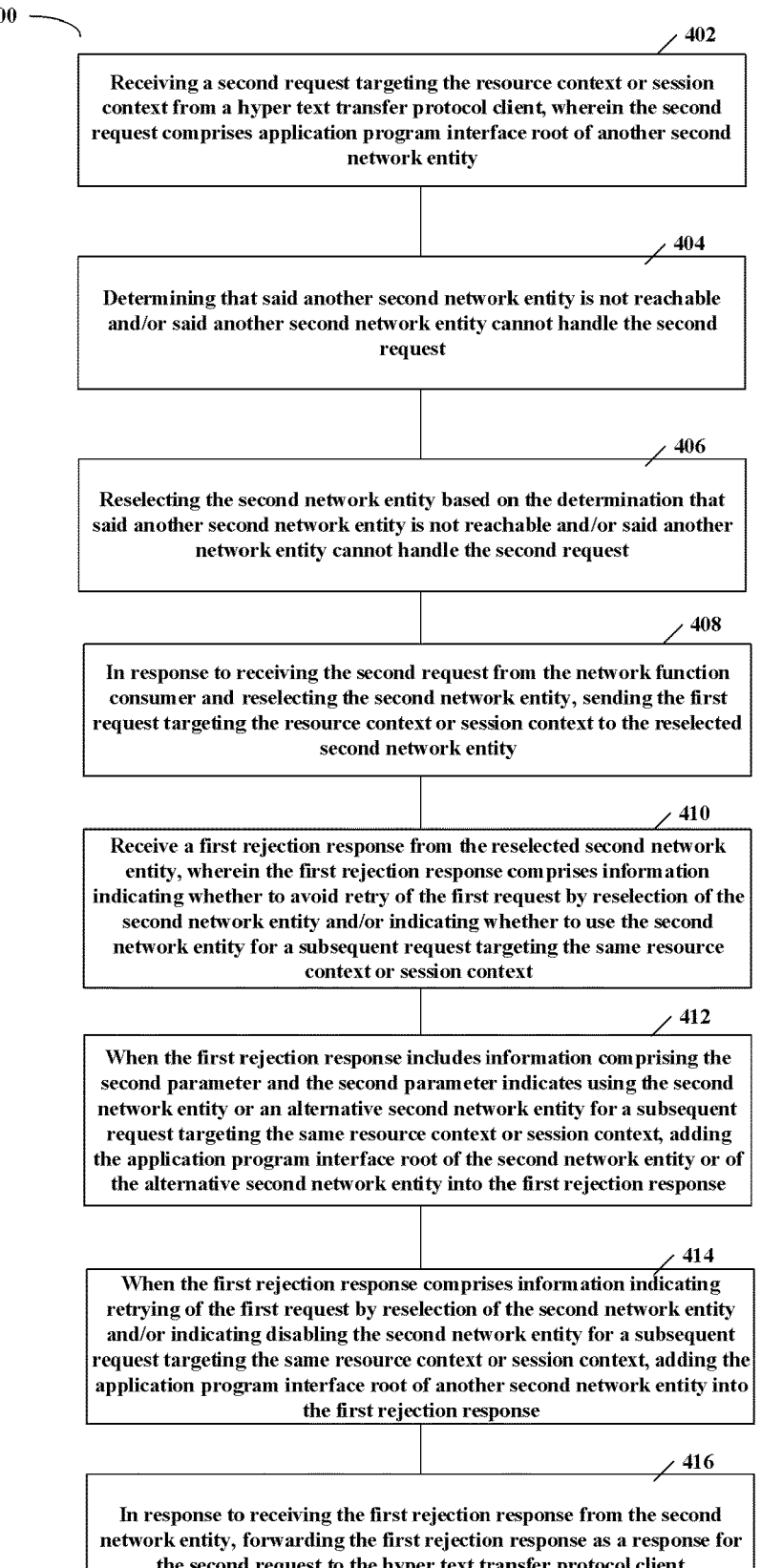

402

Receiving a second request targeting the resource context or session context from a hyper text transfer protocol client, wherein the second request comprises application program interface root of another second network entity

404

Determining that said another second network entity is not reachable and/or said another second network entity cannot handle the second request

406

Reselecting the second network entity based on the determination that said another second network entity is not reachable and/or said another network entity cannot handle the second request

408

In response to receiving the second request from the network function consumer and reselecting the second network entity, sending the first request targeting the resource context or session context to the reselected second network entity

410

Receive a first rejection response from the reselected second network entity, wherein the first rejection response comprises information indicating whether to avoid retry of the first request by reselection of the second network entity and/or indicating whether to use the second network entity for a subsequent request targeting the same resource context or session context

412

When the first rejection response includes information comprising the second parameter and the second parameter indicates using the second network entity or an alternative second network entity for a subsequent request targeting the same resource context or session context, adding the application program interface root of the second network entity or of the alternative second network entity into the first rejection response

414

When the first rejection response comprises information indicating retrying of the first request by reselection of the second network entity and/or indicating disabling the second network entity for a subsequent request targeting the same resource context or session context, adding the application program interface root of another second network entity into the first rejection response

416

In response to receiving the first rejection response from the second network entity, forwarding the first rejection response as a response for the second request to the hyper text transfer protocol client

Figure 5:
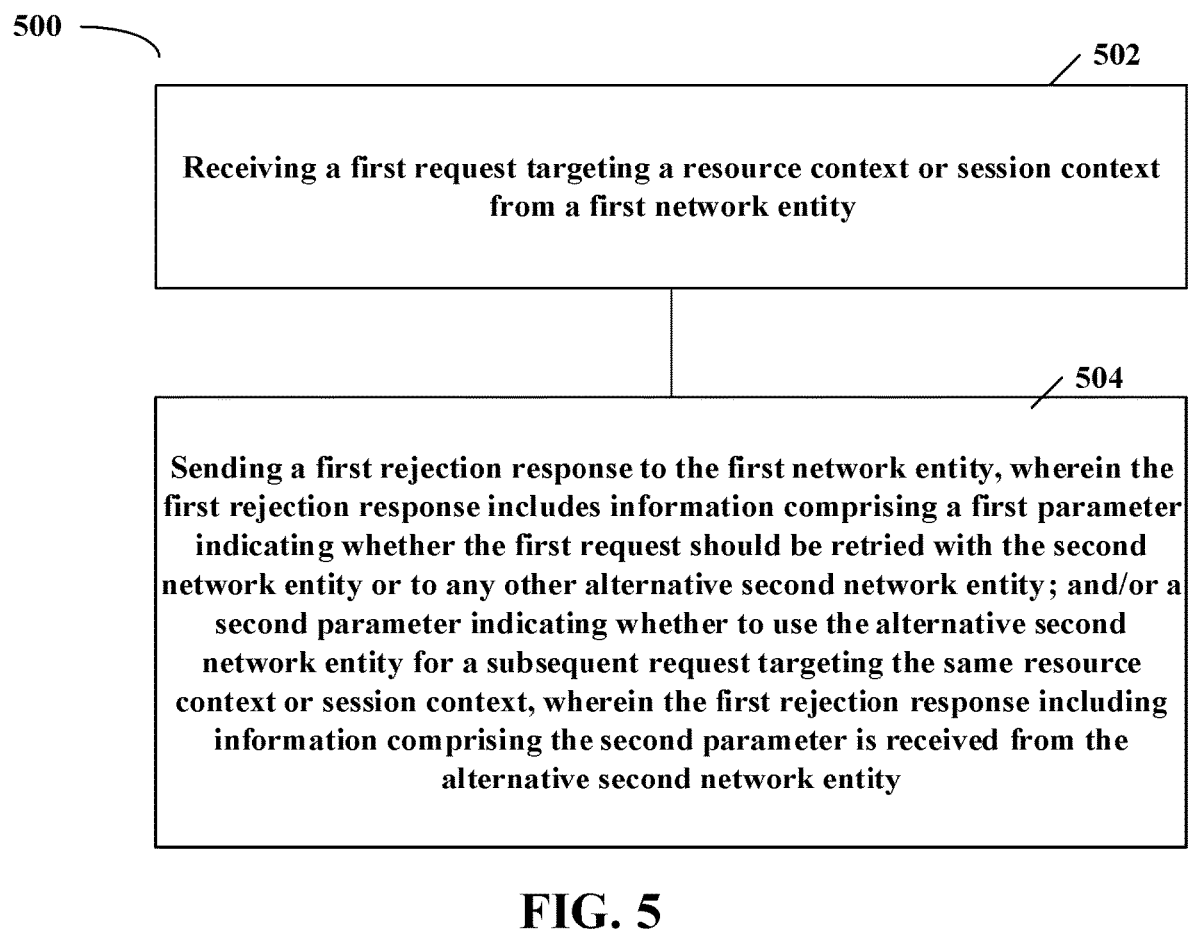

Receiving a first request targeting a resource context or session context from a first network entity

504

Sending a first rejection response to the first network entity, wherein the first rejection response includes information comprising a first parameter indicating whether the first request should be retried with the second network entity or to any other alternative second network entity; and/or a second parameter indicating whether to use the alternative second network entity for a subsequent request targeting the same resource context or session context, wherein the first rejection response including information comprising the second parameter is received from the alternative second network entity

Figure 6:
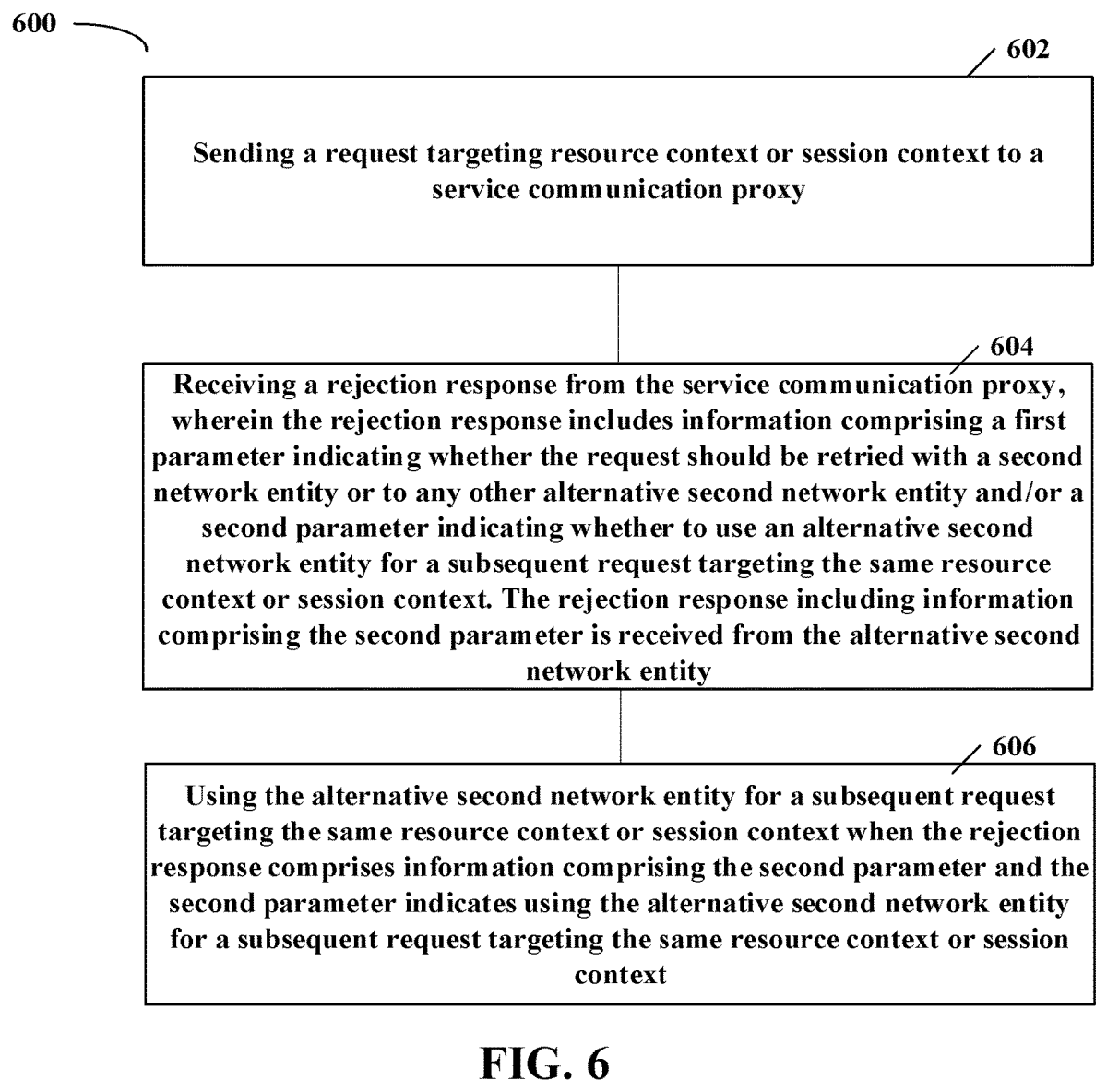

Sending a request targeting resource context or session context to a
service communication proxy

604

Receiving a rejection response from the service communication proxy,
wherein the rejection response includes information comprising a first
parameter indicating whether the request should be retried with a second
network entity or to any other alternative second network entity and/or a
second parameter indicating whether to use an alternative second
network entity for a subsequent request targeting the same resource
context or session context. The rejection response including information
comprising the second parameter is received from the alternative second
network entity

606

Using the alternative second network entity for a subsequent request
targeting the same resource context or session context when the rejection
response comprises information comprising the second parameter and the
second parameter indicates using the alternative second network entity
for a subsequent request targeting the same resource context or session
context

METHOD AND APPARATUS FOR SERVICE HANDLING

TECHNICAL FIELD

The non-limiting and exemplary embodiments of the present disclosure generally relate to the technical field of communications, and specifically to methods and apparatuses for service handling.

BACKGROUND

This section introduces aspects that may facilitate a better understanding of the disclosure. Accordingly, the statements of this section are to be read in this light and are not to be understood as admissions about what is in the prior art or what is not in the prior art.

A network function (NF) instance can be deployed such that several network function instances are present within an NF set to provide distribution, redundancy and scalability together as a set of NF instances. The same is also supported for NF services. This can be achieved when equivalent NFs and NF services share the same context data or by network function/NF service context transfer procedures. For example, in third Generation Partnership Project (3GPP) TS 23.501 V17.0.0, the disclosure of which is incorporated by reference herein in its entirety, 5GC (fifth generation core network) architecture supports redundancy with NF set, which allows another NF (service) instance taking over an existing resource context or session context created/managed by another instance within the same NF set.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

When a NF consumer or service communication proxy (SCP) tries to access resource context or session context on an NF and detects the NF is no longer available (e.g. by error response during service operation invoking towards the NF, or NF status notification via network repository function (NRF), etc.), the NF consumer or SCP may reselect an alternative NF instance in the same NF set and (re)send a service request towards the alternative NF instance. The alternative NF instance will restore the resource context or session context and process the service request to continue the service. If the reselection is done by the SCP, the SCP will indicate the alternative NF instance ID (identifier) as well as target API (application programming interface) root to the NF consumer. The NF consumer will consider that the resource context or session context is now hosted by the alternative NF instance and invoke service operations towards the resource context or session context using the alternative NF instance. The same behavior is also applicable for NF consumer reselection for notifications, where the notification request is sent by NF producer and the reselection is done by NF producer (or SCP).

When the reselected alternative NF instance successfully processes the service request and responds with a positive status code to a sender (NF consumer or SCP) of the service request, the sender can confirm that the alternative NF instance has successfully taken over the resource context or session context and thus sends subsequent messages for the resource context or session context towards the alternative NF instance.

But for failure cases, the scenarios may be different. For example, if the service request is failed at Hyper Text Transfer Protocol (HTTP) stack schema check or failed in OpenAPI inspection, the service request is rejected with a corresponding error code without involving any upper application logic, i.e. the alternative NF instance will not try to restore the resource context or session context at all.

If the alternative NF instance is too busy (e.g., overload) when receiving the service request and cannot process it, the alternative NF instance may directly reject the service request without restoration of the resource context or session context at all, or it may restore the resource context or session context by policy, e.g. to check whether it is related to high priority service that should be handled.

If the service request is correct (e.g., passing HTTP stack schema check) and the alternative NF instance is not overload, the alternative NF instance will restore the resource context or session context and continue processing the service request. But the service request may eventually fail due to application logic, e.g. some resource is not allowed to be modified at the moment.

Above all, when a service request has failed, it is very difficult for the sender of the service request to identify whether the alternative NF instance has already taken over the resource context or session context or not. For example, it is impossible for SCP without business logic understanding to identify whether the alternative NF instance has already taken over the resource context or session context or not. Without identifying whether the alternative NF instance has already taken over the resource context/session context or not, the NF consumer or SCP will not know whether the subsequent message for the concerning resource context/session context shall be sent to which NF, e.g., the alternative NF or the original NF or other alternative NF.

Additionally, for some errors, further retry on other alternative NFs are not recommended. For example, if the service request is rejected due to application logic error or state confliction. In this case, the same result will be returned regardless which NF instance hosting the resource context or session context.

To overcome or mitigate at least one above mentioned problems or other problems, the embodiments of the present disclosure propose an improved service handling solution.

In an embodiment, there is provided a mechanism in 5GC to enable an alternative NF to explicitly indicate a message sender of a request (such as HTTP request) for addressing an existing context data (such as resource context or session context) that the context data has been taken over by the alternative NF.

In an embodiment, there is provided a mechanism in 5GC to enable an alternative NF to explicitly indicate an entity which determines to perform reselection (the NF consumer if direct communication applies, or the SCP if indirect communication applies) that further reselection of alternative NF should be avoided since it may get the same result.

In an embodiment, a network function producer may provide an indication in a negative service operation response/notification response, indicating that the concerned resource context or session context has been taken over by the network function producer and whether further reselection of network function producer shall be avoided.

In a first aspect of the disclosure, there is provided a method performed by at a first network entity. The method comprises sending a first request targeting resource context or session context to a second network entity. The method further comprises receiving a first rejection response from the second network entity or an alternative second network entity. The first rejection response includes information comprising a first parameter indicating whether the first request should be retried with the second network entity or to any other alternative second network entity and/or a second parameter indicating whether to use the alternative second network entity for a subsequent request targeting the same resource context or session context. The first rejection response including information comprising the second parameter is received from the alternative second network entity.

In an embodiment, two or more of the second network entities and/or the alternative second network entities are grouped into a network function set, a network function service set, or a network function service instance set, and the two or more of the second network entities and/or the alternative second network entities are interchangeable and share the same resource context or session context.

In an embodiment, the information further indicates at least one of whether the first request is rejected due to application logic error or state confliction, or whether the resource context or session context has been taken over by the second network entity.

In an embodiment, the method further comprises avoiding retry of the first request when the first rejection response includes information comprising a first parameter and the first parameter indicates that the first request should be retried with the second network entity or to any other alternative second network entity.

In an embodiment, the method further comprises using the alternative second network entity for a subsequent request targeting the same resource context or session context when the first rejection response includes information comprising a second parameter and the second parameter indicates using the alternative second network entity for a subsequent request targeting the same resource context or session context.

In an embodiment, the second network entity or the alternative second network entity is a hyper text transfer protocol server, the first network entity is a hyper text transfer protocol client, and communication between the second network entity or the alternative second network entity and the first network entity is direct communication without a service communication proxy.

In an embodiment, the second network entity or alternative second network entity is a hyper text transfer protocol server and the first network entity is a service communication proxy.

In an embodiment, the method further comprises receiving a second request from a hyper text transfer protocol client. The sending the first request targeting the resource context or session context to the second network entity is in response to receiving the second request from the hyper text transfer protocol client. The method further comprises in response to receiving the first rejection response from the second network entity, forwarding the first rejection response as a response for the second request to the hyper text transfer protocol client.

In an embodiment, the second request comprises the application program interface root of the second network entity.

In an embodiment, the second request comprises application program interface root of another second network entity, the method further comprises determining that said another second network entity is not reachable and/or said another second network entity cannot handle the second request. The method further comprises reselecting the second network entity based on the determination that said another second network entity is not reachable and/or said another network entity cannot handle the second request. When the first rejection response includes information comprising the second parameter and the second parameter indicates using the second network entity or an alternative second network entity for a subsequent request targeting the same resource context or session context, the method further comprises adding the application program interface root of the second network entity or of the alternative second network entity into the first rejection response.

In an embodiment, the information comprises implicit information or explicit information.

In an embodiment, the first request comprises an application program interface root of the second network entity.

In an embodiment, the information is carried by a new hyper text transfer protocol header, or 3gpp-Sbi-Target-apiRoot, or 3gpp-Sbi-Binding.

In a second aspect of the disclosure, there is provided a method performed by a second network entity or an alternative second network entity. The method comprises receiving a first request targeting a resource context or session context from a first network entity. The method further comprises sending a first rejection response to the first network entity. the first rejection response includes information comprising a first parameter indicating whether the first request should be retried with the second network entity or to any other alternative second network entity and/or a second parameter indicating whether to use the alternative second network entity for a subsequent request targeting the same resource context or session context. The first rejection response including information comprising the second parameter is received from the alternative second network entity.

In an embodiment, two or more of the second network entities and/or the alternative second network entities are grouped into a network function set, a network function service set, or a network function service instance set, and the two or more of the second network entities and/or the alternative second network entities are interchangeable and share the same resource context or session context.

In an embodiment, the information further indicates at least one of whether the first request is rejected due to application logic error or state confliction, or whether the resource context or session context has been taken over by the second network entity.

In an embodiment, the second network entity or the alternative second network entity is a hyper text transfer protocol server, the first network entity is a hyper text transfer protocol client, and communication between the second network entity or the alternative second network entity and the first network entity is direct communication without a service communication proxy.

In an embodiment, the second network entity or the alternative second network entity is a hyper text transfer protocol server and the first network entity is a service communication proxy.

In an embodiment, the information comprises implicit information or explicit information.

In an embodiment, the implicit information comprises application program interface root of the second network entity.

In an embodiment, the first request comprises an application program interface root of the second network entity.

In an embodiment, the first rejection response comprises an application program interface root of the second network entity or the alternative second network entity.

In an embodiment, the information is carried by a new hyper text transfer protocol header, or 3gpp-Sbi-Target-apiRoot, or 3gpp-Sbi-Binding.

In a third aspect of the disclosure, there is provided a method performed by a third network entity. The method comprises sending a request targeting resource context or session context to a service communication proxy. The method further comprises receiving a rejection response from the service communication proxy. The rejection response includes information comprises a first parameter indicating whether the request should be retried with a second network entity or to any other alternative second network entity and/or a second parameter indicating whether to use an alternative second network entity for a subsequent request targeting the same resource context or session context. The rejection response including information comprising the second parameter is received from the alternative second network entity. The method further comprises using the alternative second network entity for a subsequent request targeting the same resource context or session context when the rejection response comprises information comprising the second parameter and the second parameter indicates using the alternative second network entity for a subsequent request targeting the same resource context or session context.

In an embodiment, the request comprises application program interface root of the second network entity.

In an embodiment, the request comprises application program interface root of another second network entity.

In an embodiment, two or more of the second network entities and/or the alternative second network entities are grouped into a network function set, a network function service set, or a network function service instance set, and the two or more of the second network entities and/or the alternative second network entities are interchangeable and share the same resource context or session context.

In an embodiment, the information further indicates at least one of whether the request is rejected due to application logic error or state confliction, or whether the resource context or session context has been taken over by the second network entity.

In an embodiment, the information comprises implicit information or explicit information.

In an embodiment, the implicit information comprises application program interface root of the second network entity.

In an embodiment, the rejection response comprises an application program interface root of the second network entity or of the alternative second network entity.

In an embodiment, the information is carried by a new hyper text transfer protocol header, or 3gpp-Sbi-Target-apiRoot, or 3gpp-Sbi-Binding.

In an embodiment, the third network entity is a hyper text transfer protocol client.

In a fourth aspect of the disclosure, there is provided a first network entity. The first network entity comprises a processor and a memory coupled to the processor. Said memory contains instructions executable by said processor. Said first network entity is operative to send a first request targeting resource context or session context to a second network entity. Said first network entity is further operative to receive a first rejection response from the second network entity or an alternative second network entity. The first rejection response includes information comprising a first parameter indicating whether the first request should be retried with the second network entity or to any other alternative second network entity and/or a second parameter indicating whether to use the alternative second network entity for a subsequent request targeting the same resource context or session context. The first rejection response including information comprising the second parameter is received from the alternative second network entity.

In a fifth aspect of the disclosure, there is provided a second network entity or an alternative second network entity. The second network entity or an alternative second network entity comprises a processor and a memory coupled to the processor. Said memory contains instructions executable by said processor. Said second network entity or an alternative second network entity is operative to receive a first request targeting resource context or session context from a first network entity. Said second network entity or an alternative second network entity is further operative to send a first rejection response to the first network entity. The first rejection response includes information comprising a first parameter indicating whether the first request should be retried with the second network entity or to any other alternative second network entity and/or a second parameter indicating whether to use the alternative second network entity for a subsequent request targeting the same resource context or session context. The first rejection response including information comprising the second parameter is received from the alternative second network entity.

In a sixth aspect of the disclosure, there is provided a third network entity. The third network entity comprises a processor and a memory coupled to the processor. Said memory contains instructions executable by said processor. Said third network entity is operative to send a request targeting resource context or session context to a service communication proxy. Said third network entity is further operative to receive a rejection response from the service communication proxy. The rejection response includes information comprising a first parameter indicating whether the first request should be retried with a second network entity or to any other alternative second network entity and/or a second parameter indicating whether to use an alternative second network entity for a subsequent request targeting the same resource context or session context. The rejection response including information comprising the second parameter is received from the alternative second network entity. Said third network entity is further operative to use the alternative second network entity for a subsequent request targeting the same resource context or session context when the rejection response comprises information comprising the second parameter and the second parameter indicates using the alternative second network entity for a subsequent request targeting the same resource context or session context.

In a seventh aspect of the disclosure, there is provided a first network entity. The first network entity comprises a sending module configured to send a first request targeting resource context or session context to a second network entity. The first network entity further comprises a first receiving module configured to receive a first rejection response from the second network entity or an alternative second network entity. The first rejection response includes information comprising a first parameter indicating whether the first request should be retried with the second network entity or to any other alternative second network entity and/or a second parameter indicating whether to use the alternative second network entity for a subsequent request targeting the same resource context or session context. The first rejection response including information comprising the second parameter is received from the alternative second network entity.

In an embodiment, the first network entity further comprises an avoiding module configured to avoid retry of the first request when the first rejection response includes information comprising a first parameter and the first parameter indicates that the first request should be retried with the second network entity or to any other alternative second network entity.

In an embodiment, the first network entity further comprises a using module configured to use the alternative second network entity for a subsequent request targeting the same resource context or session context when the first rejection response includes information comprising a second parameter and the second parameter indicates using the alternative second network entity for a subsequent request targeting the same resource context or session context.

In an embodiment, the first network entity further comprises a second receiving module configured to receive a second request from a hyper text transfer protocol client. The sending module is configured to send the first request targeting the resource context or session context to the second network entity is in response to receiving the second request from the hyper text transfer protocol client.

In an embodiment, the first network entity further comprises a forwarding module configured to forward the first rejection response as a response for the second request to the hyper text transfer protocol client in response to receiving the first rejection response from the second network entity.

The first network entity further comprises a determining module configured to determine that said another second network entity is not reachable and/or said another second network entity cannot handle the second request.

The first network entity further comprises a reselecting module configured to reselect the second network entity based on the determination that said another second network entity is not reachable and/or said another network entity cannot handle the second request.

The first network entity further comprises a first adding module configured to add the application program interface root of the second network entity or of the alternative second network entity into the first rejection response when the first rejection response includes information comprising the second parameter and the second parameter indicates using the second network entity or an alternative second network entity for a subsequent request targeting the same resource context or session context.

In an eighth aspect of the disclosure, there is provided a second network entity or an alternative second network entity according to an embodiment of the disclosure. The second network entity or an alternative second network entity comprises a receiving module configured to receive a first request targeting a resource context or session context from a first network entity. The second network entity or an alternative second network entity further comprises a sending module configured to send a first rejection response to the first network entity. The first rejection response includes information comprising a first parameter indicating whether the first request should be retried with the second network entity or to any other alternative second network entity and/or a second parameter indicating whether to use the alternative second network entity for a subsequent request targeting the same resource context or session context. The first rejection response including information comprising the second parameter is received from the alternative second network entity.

In a ninth aspect of the disclosure, there is provided a third network entity. The third network entity comprises a sending module configured to send a request targeting resource context or session context to a service communication proxy. The third network entity further comprises a receiving module configured to receive a rejection response from the service communication proxy. The rejection response includes information comprising a first parameter indicating whether the request should be retried with a second network entity or to any other alternative second network entity and/or a second parameter indicating whether to use an alternative second network entity for a subsequent request targeting the same resource context or session context. The rejection response including information comprising the second parameter is received from the alternative second network entity The third network entity further comprises a using module configured to use the alternative second network entity for a subsequent request targeting the same resource context or session context when the rejection response comprises information comprising the second parameter and the second parameter indicates using the alternative second network entity for a subsequent request targeting the same resource context or session context.

In a tenth aspect of the disclosure, there is provided a computer-readable storage medium storing instructions which when executed by at least one processor, cause the at least one processor to perform any of the methods according to the first, second and third aspects of the disclosure.

In an eleventh aspect of the disclosure, there is provided a computer program product, comprising instructions which, when executed on at least one processor, cause the at least one processor to carry out any of the methods according to the first, second and third aspects of the disclosure.

Many advantages may be achieved by applying the proposed solution according to embodiments of the present disclosure. For example, some embodiments of the present disclosure can enable a second NF to indicate a first NF (which sends a request to the second NF) how to send a subsequent request when a current request is rejected by the second NF. For example, the second NF may indicate the first NF that the context data (such as resource context or session context) has been taken over by the second NF or the second network entity is used for processing a subsequent request from the first NF. The first NF shall update the resource URI or session URI by replacing apiRoot using the apiRoot of the second NF, even when the current request is rejected by the second NF. Some embodiments of the present disclosure provide a mechanism to instruct a NF which performs a NF reselection to not do the NF reselection, which may reduce extra signaling for the further NF reselection. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 2 shows a flowchart of a method according to an embodiment of the present disclosure;

FIG. 3 shows a flowchart of a method according to another embodiment of the present disclosure;

FIG. 4 shows a flowchart of a method according to another embodiment of the present disclosure;

FIG. 5 shows a flowchart of a method according to another embodiment of the present disclosure;

FIG. 6 shows a flowchart of a method according to another embodiment of the present disclosure;

DETAILED DESCRIPTION

Figure 1A:
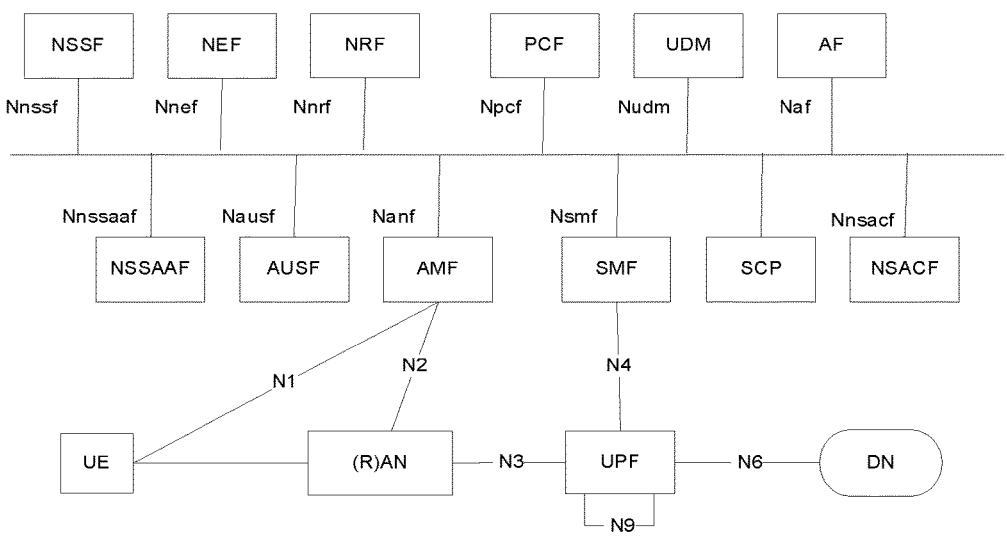
FIG. 1a schematically shows a high level architecture in the fifth generation network according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the first generation (1G), 2G, 3G, 4G, 4.5G, 5G communication protocols, and/or any other protocols either currently known or to be developed in the future.

The term "network device" or "network node" or "network function (NF)" refers to any suitable function which can be implemented in a network entity (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), NSSF (Network Slice Selection Function), NSSAAF (Network Slice-Specific Authentication and Authorization Function), etc.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/of" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Figure 1B:
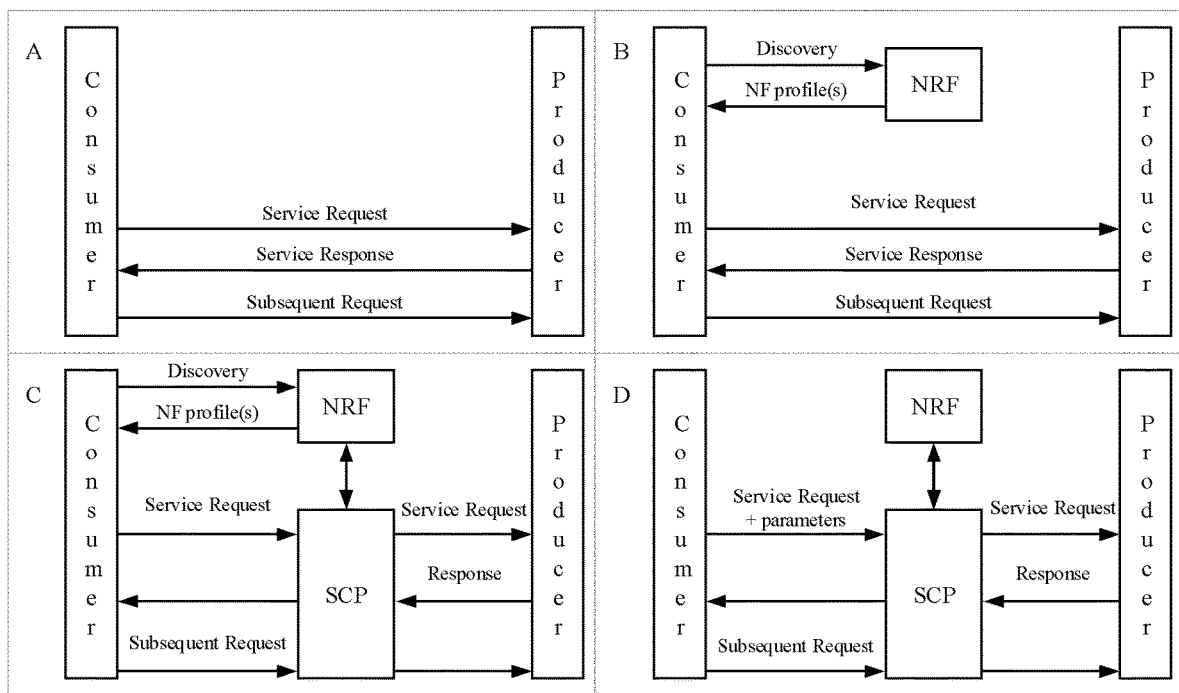
FIG. 1b shows communication models for NF/NF services interaction according to an embodiment of the present disclosure.

Although the subject matter described herein may be implemented in any appropriate type of system using any suitable components, the embodiments disclosed herein are described in relation to a communication system complied with the exemplary system architectures illustrated in FIG. 1a-1b. For simplicity, the system architectures of FIG. 1a-1b only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1a schematically shows a high level architecture in the fifth generation network according to an embodiment of the present disclosure. For example, the fifth generation network may be 5GS. The architecture of FIG. 1a is same as FIG. 4.2.3-1 as described in 3GPP TS 23.501 V17.0.0. The system architecture of FIG. 1a may comprise some exemplary elements such as AUSF, AMF, DN (data network), NEF, NRF, NSSF, PCF, SMF, UDM, UPF, AF, UE (user equipment), (R)AN ((radio) access network), SCP (Service Communication Proxy), NSSAAF (Network Slice-Specific Authentication and Authorization Function), NSACF (Network Slice Admission Control Function), etc.

In accordance with an exemplary embodiment, the UE can establish a signaling connection with the AMF over the reference point N1, as illustrated in FIG. 1a. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 1a, the exemplary system architecture also contains the service-based interfaces such as Nnrf, Nnef, Nausf, Nudm, Npcf, Namf, Nnsacf and Nsmf exhibited by NFs such as the NRF, the NEF, the AUSF, the UDM, the PCF, the AMF, the NSACF and the SMF. In addition, FIG. 1a also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 1a may be responsible for functions such as session management, mobility management, authentication, security, etc. The AUSF, AMF, DN, NEF, NRF, NSSF, PCF, SMF, UDM, UPF, AF, UE, (R)AN, SCP, NSACF may include the functionality for example as defined in clause 6.2 of 3GPP TS 23.501 V17.0.0.

As used herein, the NF consumer may be any suitable NF or NF instance which needs to use one or more services provided by another NF. The NF producer may be any suitable NF or NF instance which can provide one or more services to one or more NF consumers. If an NF can provide one or more services to any other NFs, the NF may register its NF profile in the NRF.

FIG. 1b shows communication models for NF/NF services interaction according to an embodiment of the present disclosure.

Service communication proxy (SCP) as a network element is introduced in service framework. Routing of the service based interface (SBI) messages for network function (NF) interaction mechanisms may be direct as shown in model A and model B of FIG. 1b, or indirect in model C and model D of FIG. 1b. In case of indirect communication, the SCP is employed by the NF service consumer. The SCP routes messages between NF service consumers and NF service producers and may do discovery and associated selection of the NF service producer on behalf of a NF service consumer.

Model A—Direct communication without NRF interaction: Neither NRF nor SCP are used. Consumers are configured with producers' "NF profiles" and directly communicate with a producer of their choice.

Model B—Direct communication with NRF interaction: Consumers do discovery by querying the NRF. Based on the discovery result, the consumer does the selection. The consumer sends the request to the selected producer.

Model C—Indirect communication without delegated discovery: Consumers do discovery by querying the NRF. Based on discovery result, the consumer does the selection of an NF Set or a specific NF instance of NF set. The consumer sends the request to the SCP containing the address of the selected service producer pointing to a NF service instance or a set of NF service instances. In the latter case, the SCP selects an NF Service instance. If possible, the SCP interacts with NRF to get selection parameters such as location, capacity, etc. The SCP routes the request to the selected NF service producer instance.

Model D—Indirect communication with delegated discovery: Consumers do not do any discovery or selection. The consumer adds any necessary discovery and selection parameters required to find a suitable producer to the service request. The SCP uses the request address and the discovery and selection parameters in the request message to route the request to a suitable producer instance. The SCP can perform discovery with an NRF and obtain a discovery result.

As described in clause 6.2.19 of 3GPP TS 23.501 V17.0.0, the SCP may include one or more of the following functionalities. Some or all of the SCP functionalities may be supported in a single instance of an SCP:

Indirect Communication.

Delegated Discovery.

Message forwarding and routing to destination NF/NF service.

Message forwarding and routing to a next hop SCP.

Communication security (e.g. authorization of the NF Service Consumer to access the NF Service Producer API), load balancing, monitoring, overload control, etc.

Optionally interact with UDR (Unified Data Repository), to resolve the UDM (Unified Data Management) Group ID (identifier)/UDR Group ID/AUSF Group ID/PCF Group ID/CHF (Charging Function) Group ID/HSS (Home Subscriber Server) Group ID based on UE identity, e.g. SUPI (Subscription Permanent Identifier) or IMPI (IP Multimedia Private Identity)/IMPU (IP Multimedia Public Identity).

SCP can be deployed distributed, redundant, and scalable. SCPs can be deployed at PLMN (public land mobile network) level, shared-slice level and slice-specific level.

In order to enable SCPs to route messages through several SCPs (i.e. next SCP hop discovery), an SCP may register its profile in the NRF. Alternatively, local configuration may be used.

FIG. 2 shows a flowchart of a method according to an embodiment of the present disclosure, which may be performed by an apparatus implemented in/as or communicatively coupled to a first network entity. As such, the apparatus may provide means for accomplishing various parts of the method 200 as well as means for accomplishing other processes in conjunction with other components.

At block 202, the first network entity may send a first request targeting resource context or session context to a second network entity. The first network entity may be any suitable network function such as a network function consumer or a service communication proxy. The second network entity may be any suitable network function such as a network function producer.

In an embodiment, the second network entity is a network function producer and the first network entity is a network function consumer.

In an embodiment, the second network entity is a network function producer and the first network entity is a service communication proxy.

In an embodiment, the second network entity is a hyper text transfer protocol server. The first network entity is a hyper text transfer protocol client. Communication between the second network entity and the first network entity is direct communication without a service communication proxy.

In an embodiment, the second network entity or the alternative second network entity is a hyper text transfer protocol server, the first network entity is a hyper text transfer protocol client, and communication between the second network entity or the alternative second network entity and the first network entity is direct communication without a service communication proxy.

In an embodiment, the second network entity or alternative second network entity is a hyper text transfer protocol server and the first network entity is a service communication proxy.

In an embodiment, the second network entity is a hyper text transfer protocol server and the first network entity is a service communication proxy.

In an embodiment, two or more second network entities are grouped into a network function set. The two or more second network entities are interchangeable and share the same resource context or session context. For example, as described in clause 5.21.3 of 3GPP TS 23.501 V17.0.0, equivalent control plane NFs may be grouped into NF Sets, e.g. several SMF instances are grouped into an SMF Set. NFs within a NF Set are interchangeable because they share the same context data, and may be deployed in different locations, e.g. different data centers. The NF producer instance is the NF instance which hosts the NF Service Producer. When the NF producer instance is not available, another NF producer instance within the same NF Set is selected. For Direct Communication mode, the NF Service consumer may subscribe to status change notifications of NF instance from the NRF. If the NF Service consumer is notified by the NRF or detects by itself (e.g. request is not responded) that the NF producer instance is not available anymore, another available NF producer instance within the same NF Set is selected by the NF Service consumer. For Indirect Communication mode, the SCP or NF Service consumer may subscribe to status change notifications of NF instance from the NRF and selects another NF producer instance within the same NF Set if the original NF producer instance serving the UE is not available anymore.

The first request may be any suitable request. For example, the first request may be any suitable request which can be sent from a NF consumer to a NF producer or from SCP to a NF producer as described in 3GPP TS 23.502 V17.0.0, the disclosure of which is incorporated by reference herein in its entirety. In an embodiment, the first request may be an HTTP request.

In an embodiment, the first request may comprise an application program interface root of the second network entity. The first network entity may obtain the application program interface root of the second network entity in various ways. For example, the NF/NF service discovery procedure as defined in clauses 4.17.4 and 4.17.5 of 3GPP TS 23.502 V17.0.0 may be performed by the first network entity. In a successful discovery the first network entity gets the NF profile(s) matching the search criteria provided in the Nnrf_NFDiscovery_Request message. When delegated service discovery as defined in clauses 4.17.9 and 4.17.10 of 3GPP TS 23.502 V17.0.0 is used, the NF/NF service discovery procedure as defined in clauses 4.17.4 and 4.17.5 of 3GPP TS 23.502 V17.0.0 may be performed by SCP. In a successful discovery the SCP gets the NF profile(s) matching the search criteria provided in the Nnrf_NFDiscovery_Request message, selects a NF and sends information of the selected NF to the first network entity.

At block 204, the first network entity may receive a first rejection response from the second network entity or an alternative second network entity.

In an embodiment, the first rejection response includes information comprising a first parameter indicating whether the first request should be retried with the second network entity or to any other alternative second network entity and/or a second parameter indicating whether to use the alternative second network entity for a subsequent request targeting the same resource context or session context. The first rejection response including information comprising the second parameter is received from the alternative second network entity.

In an embodiment, the first rejection response comprises information indicating whether to avoid retry of the first request by reselection of the second network entity and/or indicating whether to use the second network entity for a subsequent request targeting the same resource context or session context. The rejection may be due to various reasons, for example, the first request is failed at HTTP stack schema check or failed in OpenAPI inspection, the second network entity is too busy (overload) when receiving the request message and cannot process it, the first request is failed due to application logic, e.g. some resource is not allowed to be modified at the moment, etc.

In an embodiment, the information may be carried by a new hyper text transfer protocol header, or 3gpp-Sbi-Target-apiRoot, or 3gpp-Sbi-Binding. The 3gpp-Sbi-Target-api-Root and 3gpp-Sbi-Binding may be same as the 3gpp-Sbi-Target-apiRoot and 3gpp-Sbi-Binding as described in 3GPP TS 29.500 V17.2.0, the disclosure of which is incorporated by reference herein in its entirety.

In an embodiment, the information may take any suitable form such as an indicator, a bit, a flag, etc.

In an embodiment, the information further indicates at least one of: whether the first request is rejected due to application logic error or state confliction, or whether the resource context or session context has been taken over by the second network entity. After receiving the first rejection response, the first network entity may know the rejection reason and whether the resource context or session context has been taken over by the second network entity. The first network entity may perform any suitable action based on such information. For example, the first network entity may amend the first request to avoid the application logic error or state confliction and resend the amended first request to the second network entity. The first network entity may resend the first request to the second network entity at a later time. Alternatively, the first network entity may notify the error information to any other suitable network function.

In an embodiment, the information may comprise implicit information or explicit information. The explicit information may be dedicated indication information. The implicit information may be any suitable information which can be used for such indication and any other suitable purpose. For example, the implicit information may comprise application program interface root of the second network entity. The application program interface root (apiRoot) of the second network entity may be used to indicate the apiRoot of target uniform resource identifier (URI). In an embodiment, the application program interface root of the second network entity may be 3gpp-Sbi-Target-apiRoot as described in clause 5.2.3.2.4 of 3GPP TS 29.500 V17.2.0. An example of 3gpp-Sbi-Target-apiRoot is: 3gpp-Sbi-Target-apiRoot: https://example.com/a/b/c.

At block 206, optionally, the first network entity may avoid retry of the first request when the first rejection response includes information comprising a first parameter and the first parameter indicates that the first request should be retried with the second network entity or to any other alternative second network entity.

In an embodiment, the first network entity may avoid retry of the first request by reselection of the second network entity when the first rejection response comprises information indicating avoiding retry of the first request by reselection of the second network entity and/or indicating using the second network entity for a subsequent request targeting the same resource context or session context. The first network entity may know that further reselection of alternative second network entity should be avoided since it may get the same result. In this embodiment, it may reduce extra signaling for the further reselection.

At block 208, optionally, the first network entity may use the alternative second network entity for a subsequent request targeting the same resource context or session context when the first rejection response includes information comprising a second parameter and the second parameter indicates using the alternative second network entity for a subsequent request targeting the same resource context or session context.

In an embodiment, the first network entity may use the second network entity for a subsequent request targeting the same resource context or session context when the first rejection response comprises information indicating avoiding retry of the first request by reselection of the second network entity and/or indicating using the second network entity for a subsequent request targeting the same resource context or session context.

FIG. 3 shows a flowchart of a method according to another embodiment of the present disclosure, which may be performed by an apparatus implemented in/as or communicatively coupled to a first network entity. As such, the apparatus may provide means for accomplishing various parts of the method 300 as well as means for accomplishing other processes in conjunction with other components. For some parts which have been described in the above embodiments, detailed description thereof is omitted here for brevity. In this embodiment, the second network entity may be a network function producer or a hyper text transfer protocol server and the first network entity may be a service communication proxy.

At block 302, the first network entity may receive a second request from a hyper text transfer protocol client (e.g., NF service consumer). The first network entity may send the first request targeting the resource context or session context to the second network entity in response to receiving the second request from the hyper text transfer protocol client. For example, when the hyper text transfer protocol client intends to communicate with the second network entity (e.g., NF service producer or hyper text transfer protocol server), the hyper text transfer protocol client may send the second request to the first network entity such as SCP.

In an embodiment, the second request may include discovery and selection parameters necessary to discover and select the second network entity. The discovery and selection parameters are included in the second request by the hyper text transfer protocol client in a way that the first network entity such as SCP does not need to parse the request body. The first network entity such as SCP may perform discovery upon the second request either by interacting with an NRF using Nnrf_NFDiscovery service or may use information collected during the previous interactions with an NRF (by the Nnrf_NFDiscovery service or Nnrf_NFManagement_NFStatusNotify service operation). The first network entity such as SCP together with the NRF authorizes the second request. The first network entity such as SCP selects the second network entity.

In another embodiment, the second request may include the application program interface root of the second network entity. For example, on a subsequent operation on a created resource context or session context, the NF service consumer addresses the existing context data (such as resource context or session context) via the resource address returned by the second NF. In this case, the first NF may know the second request may be sent/forwarded to the resource address of the second NF.

At block 304, in response to receiving the second request from the network function consumer, the first network entity may send the first request targeting resource context or session context to the second network entity.

At block 306, the first network entity may receive a first rejection response from the second network entity or an alternative second network entity. The first rejection response comprises information indicating whether to avoid retry of the first request by reselection of the second network entity and/or indicating whether to use the second network entity for a subsequent request targeting the same resource context or session context.

At block 308, in response to receiving the first rejection response from the second network entity, the first network entity may forward the first rejection response as a response for the second request to the hyper text transfer protocol client.

FIG. 4 shows a flowchart of a method according to another embodiment of the present disclosure, which may be performed by an apparatus implemented in/as or communicatively coupled to a first network entity. As such, the apparatus may provide means for accomplishing various parts of the method 400 as well as means for accomplishing other processes in conjunction with other components. For some parts which have been described in the above embodiments, detailed description thereof is omitted here for brevity. In this embodiment, the second network entity may be a network function producer and the first network entity may be a service communication proxy.

At block 402, the first network entity may receive a second request targeting the resource context or session context from a hyper text transfer protocol client.

In an embodiment, the second request may comprise application program interface root of another second network entity. For example, on a subsequent operation on a created resource, the hyper text transfer protocol client (such as NF service consumer) addresses the existing context data (such as resource context/session context) via the resource address returned by said another second network entity. In this case, the first NF may know the second request may be sent/forwarded to the resource address of said another second NF.

At block 404, the first NF may determine that said another second network entity is not reachable and/or said another second network entity cannot handle the second request. The first NF may determine that said another second network entity is not reachable or cannot handle the second request in various ways. For example, the first network entity may send/forward the second request to said another second network entity and receive error response from said another second network entity or does not receive any response from said another second network entity. The second request may be rejected due to various reasons such as temporary failure cause, e.g., insufficient memory, which indicate the second request is not handled. The second request may be timeout (no response received). The first NF has already determined that said another second network is not reachable.

At block 406, the first network entity may reselect the second network entity based on the determination that said another second network entity is not reachable and/or said another network entity cannot handle the second request. The second network entity and said another second network entity may belong to a network function set, are interchangeable and share same context data (such as resource context or session context). For example, the details of reselection of a target NF service producer instance have been described in clause 6.3.1.0 of TS 23.501 V17.0.0.

At block 408, in response to receiving the second request from the network function consumer and reselecting the second network entity, the first network entity may send the first request targeting the resource context or session context to the reselected second network entity.

At block 410, the first network entity may receive a first rejection response from the reselected second network entity. The first rejection response comprises information indicating whether to avoid retry of the first request by reselection of the second network entity and/or indicating whether to use the second network entity for a subsequent request targeting the same resource context or session context.

At block 412, when the first rejection response includes information comprising the second parameter and the second parameter indicates using the second network entity or an alternative second network entity for a subsequent request targeting the same resource context or session context, the first network entity may add the application program interface root of the second network entity or of the alternative second network entity into the first rejection response.

In an embodiment, when the first rejection response comprises information indicating avoiding retry of the first request by reselection of the second network entity and/or indicating using the second network entity for a subsequent request targeting the same resource context or session context, the first network entity may add the application program interface root of the second network entity into the first rejection response. When the first rejection response has comprised the application program interface root of the second network entity, block 412 may be skipped.

At block 414, when the first rejection response comprises information indicating retrying of the first request by reselection of the second network entity and/or indicating disabling the second network entity for a subsequent request targeting the same resource context or session context, the first network entity may add the application program interface root of another second network entity into the first rejection response.

At block 416, in response to receiving the first rejection response from the second network entity, the first network entity may forward the first rejection response as a response for the second request to the hyper text transfer protocol client. Since the first rejection response comprises a resource address such as application program interface root of the second network entity or the application program interface root of another second network entity, the network function consumer may use it for subsequent requests regarding the concerned resource.

In an embodiment, two or more of the second network entities and/or the alternative second network entities are grouped into a network function set, a network function service set, or a network function service instance set, and the two or more of the second network entities and/or the alternative second network entities are interchangeable and share the same resource context or session context.

FIG. 5 shows a flowchart of a method according to another embodiment of the present disclosure, which may be performed by an apparatus implemented in/as or communicatively coupled to a second network entity or an alternative second network entity. As such, the apparatus may provide means for accomplishing various parts of the method 500 as well as means for accomplishing other processes in conjunction with other components. For some parts which have been described in the above embodiments, detailed description thereof is omitted here for brevity.

At block 502, the second network entity or the alternative second network entity may receive a first request targeting a resource context or session context from a first network entity. For example, the first network entity may send the first request targeting a resource context or session context to the second network entity at block 204 of FIG. 2, and then the second network entity may receive the first request targeting a resource context or session context from the first network entity.

At block 504, the second network entity or the alternative second network entity may send a first rejection response to the first network entity.

In an embodiment, the first rejection response includes information comprising a first parameter indicating whether the first request should be retried with the second network entity or to any other alternative second network entity and/or a second parameter indicating whether to use the alternative second network entity for a subsequent request targeting the same resource context or session context. The first rejection response including information comprising the second parameter is received from the alternative second network entity.

In an embodiment, the first rejection response comprises information indicating whether to avoid retry of the first request by reselection of the second network entity and/or indicating whether to use the second network entity for a subsequent request targeting the same resource context or session context. The first request may be rejected by the second network entity due to various reasons. For example, the second network entity cannot process the first request currently due to application logic error or state confliction. In addition, the second network entity may have taken over the context data (such as resource context or session context) for the first request. The second network entity expects to process a subsequent request from the first network entity. The second network entity may determine that the first network entity should not reselect another second network entity.

In an embodiment, the first rejection response comprises an application program interface root of the second network entity or the alternative second network entity.

FIG. 6 shows a flowchart of a method according to another embodiment of the present disclosure, which may be performed by an apparatus implemented in/as or communicatively coupled to a third network entity. As such, the apparatus may provide means for accomplishing various parts of the method 600 as well as means for accomplishing other processes in conjunction with other components. For some parts which have been described in the above embodiments, detailed description thereof is omitted here for brevity.

At block 602, the third network entity may send a request targeting resource context or session context to a service communication proxy. For example, the request may be the second request as described above.

In an embodiment, the third network entity is a hyper text transfer protocol client.

In an embodiment, the request comprises application program interface root of the second network entity.

In an embodiment, the request comprises application program interface root of another second network entity.

At block 604, the third network entity may receive a rejection response from the service communication proxy.

In an embodiment, the rejection response comprises information indicating whether to avoid retry of the request by a reselection of a second network entity and/or whether to use the second network entity for a subsequent request. For example, the rejection response may be the first rejection response as described above.

In an embodiment, the rejection response includes information comprising a first parameter indicating whether the request should be retried with a second network entity or to any other alternative second network entity and/or a second parameter indicating whether to use an alternative second network entity for a subsequent request targeting the same resource context or session context. The rejection response including information comprising the second parameter is received from the alternative second network entity.

In an embodiment, the rejection response comprises an application program interface root of the second network entity or of the alternative second network entity.

In an embodiment, the information further indicates at least one of whether the request is rejected due to application logic error or state confliction, or whether the resource context or session context has been taken over by the second network entity.

In an embodiment, the information comprises implicit information or explicit information.

In an embodiment, the implicit information comprises application program interface root of the second network entity.

In an embodiment, the rejection response comprises an application program interface root of the second network entity.

In an embodiment, the information is carried by a new hyper text transfer protocol header, or 3gpp-Sbi-Target-apiRoot, or 3gpp-Sbi-Binding.

At block 606, the third network entity may use the alternative second network entity for a subsequent request targeting the same resource context or session context when the rejection response comprises information comprising the second parameter and the second parameter indicates using the alternative second network entity for a subsequent request targeting the same resource context or session context.

In an embodiment, the third network entity may use the second network entity for the subsequent request when the rejection response comprises information indicating avoiding retry of the request by reselection of the second network entity and/or indicating using the second network entity for a subsequent request targeting the same resource context or session context. For example, the third network entity may update the resource context or session context URI with the one included in the rejection response for any subsequent request for the same context resource context or session context.

Figure 7:
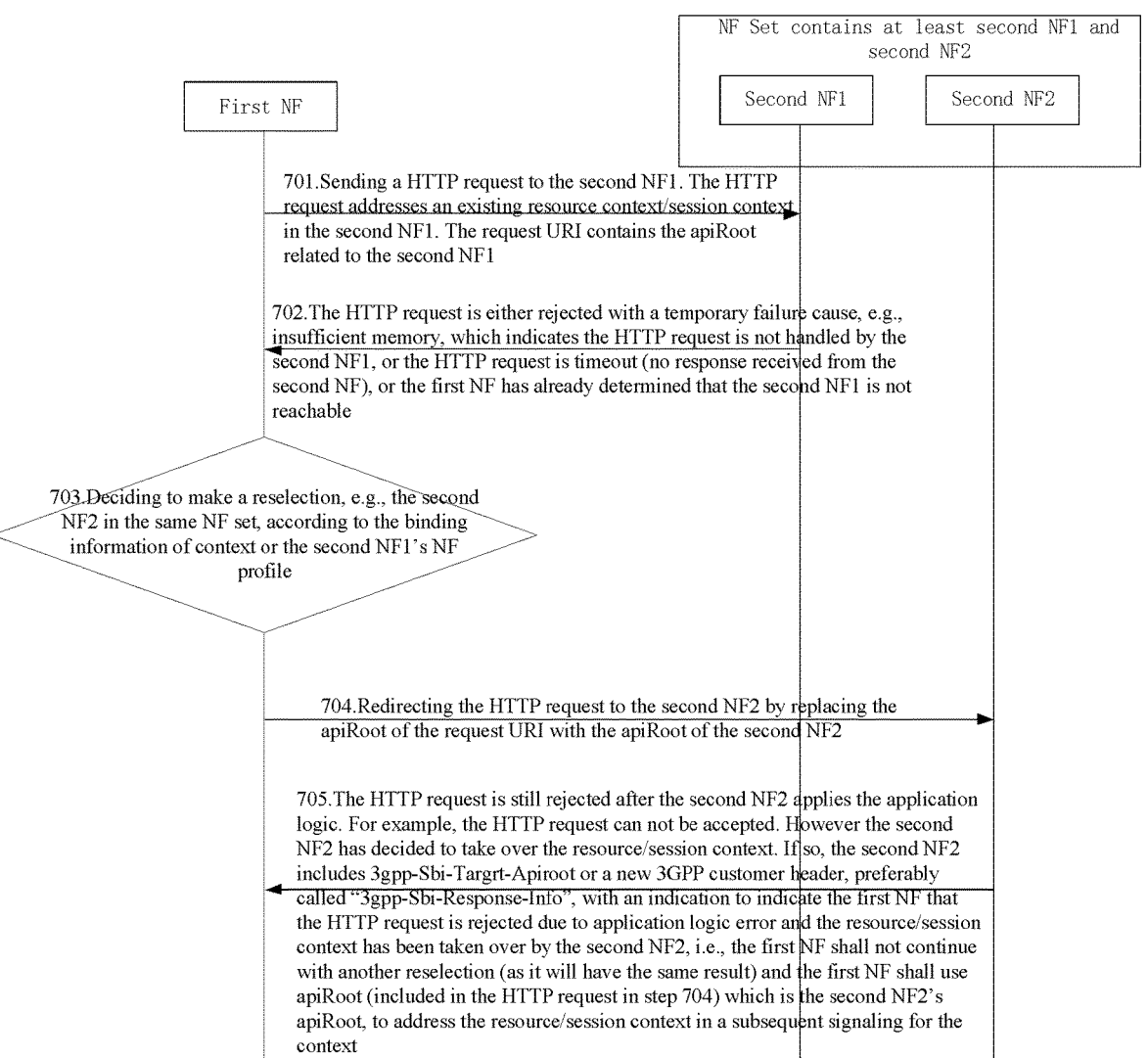
FIG. 7 shows a flowchart of a method according to another embodiment of the present disclosure.

FIG. 7 shows a flowchart of a method according to another embodiment of the present disclosure. In this embodiment, second NF1 and second NF2 are grouped into a network function set. Second NF1 and second NF2 are interchangeable and share same context data. This embodiment is related to direct communication without SCP. It is noted that though only two NFs are shown to be comprised in the network function set, the network function set may comprise any suitable number of NFs.

At step 701, the first NF may send a HTTP request to the second NF1. The HTTP request addresses an existing resource context or session context in the second NF1. The request URI contains the apiRoot related to the second NF1.

At step 702, the HTTP request is either rejected with a temporary failure cause, e.g., insufficient memory, which indicates the HTTP request is not handled by the second NF1, or the HTTP request is timeout (no response received from the second NF), or the first NF has already determined that the second NF1 is not reachable.

At step 703, the first NF may decide to make a reselection (e.g., the second NF2 in the same NF set) according to the binding information of context or the second NF1's NF profile. For example, the details of reselection of a target NF service producer instance have been described in clause 6.3.1.0 of TS 23.501 V17.0.0.

At step 704, the first NF may send/redirect the HTTP request to the second NF2 by replacing the apiRoot of the request URI with the apiRoot of the second NF2.

At step 705, the second NF2 may send a rejection response to the first NF. For example, the HTTP request is still rejected after the second NF2 applies the application logic. For example, the HTTP request can not be accepted. However the second NF2 has decided to take over the resource context or session context. If so, the second NF2 includes 3gpp-Sbi-Targrt-Apiroot or a new 3GPP customer header, which may be called "3gpp-Sbi-Response-Info", with an indication to indicate the first NF that the HTTP request is rejected due to application logic error and the resource context or session context has been taken over by the second NF2, i.e., the first NF shall not continue with another reselection (as it will have the same result) and the first NF shall use apiRoot (included in the HTTP request in step 704) which is the second NF2's apiRoot, to address the resource context or session context in a subsequent request for the context.

Figure 8:
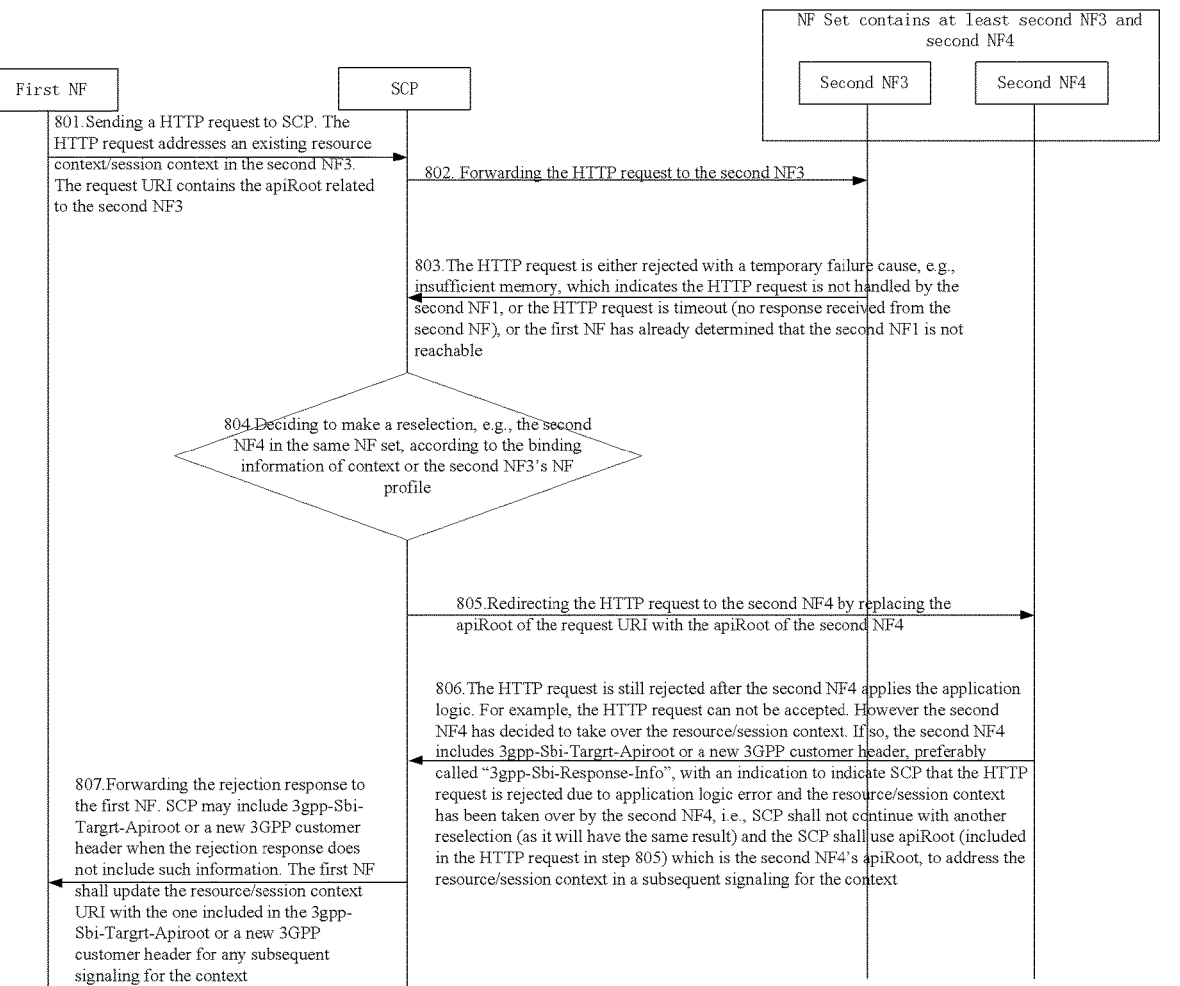
FIG. 8 shows a flowchart of a method according to another embodiment of the present disclosure.

FIG. 8 shows a flowchart of a method according to another embodiment of the present disclosure. In this embodiment, second NF3 and second NF4 are grouped into a network function set. Second NF3 and second NF4 are interchangeable and share same context data. This embodiment is related to indirect communication with SCP. It is noted that though only two NFs are shown to be comprised in the network function set, the network function set may comprise any suitable number of NFs.

At step 801, the first NF may send a HTTP request to SCP. The HTTP request addresses an existing resource context or session context in the second NF3. The request URI contains the apiRoot related to the second NF3.

At step 802, SCP forwards the HTTP request to the second NF3.

At step 803, the HTTP request is either rejected with a temporary failure cause, e.g., insufficient memory, which indicates the HTTP request is not handled by the second NF3, or the HTTP request is timeout (no response received from the second NF), or SCP has already determined that the second NF3 is not reachable.

At step 804, SCP may decide to make a reselection (e.g., the second NF4 in the same NF set) according to the binding information of context or the second NF3's NF profile. For example, the details of reselection of a target NF service producer instance have been described in clause 6.3.1.0 of TS 23.501 V17.0.0.

At step 805, SCP may send/redirect the HTTP request to the second NF4 by replacing the apiRoot of the request URI with the apiRoot of the second NF4.

At step 806, the second NF4 may send a rejection response to SCP. For example, the HTTP request is still rejected after the second NF4 applies the application logic. For example, the HTTP request can not be accepted. However the second NF4 has decided to take over the resource context or session context. If so, the second NF4 includes 3gpp-Sbi-Targrt-Apiroot or a new 3GPP customer header, which may be called "3gpp-Sbi-Response-Info", with an indication to indicate SCP that the HTTP request is rejected due to application logic error and the resource context or session context has been taken over by the second NF4, i.e., SCP shall not continue with another reselection (as it will have the same result) and the SCP shall use apiRoot (included in the HTTP request in step 805) which is the second NF4's apiRoot, to address the resource context or session context in a subsequent signaling for the context.

At step 807, SCP may forward/send the rejection response to the first NF. SCP may include 3gpp-Sbi-Targrt-Apiroot or a new 3GPP customer header when the rejection response does not include such information. The first NF may update the resource context or session context URI with the one included in the 3gpp-Sbi-Targrt-Apiroot or a new 3GPP customer header for any subsequent signaling for the context.

Many advantages may be achieved by applying the proposed solution according to embodiments of the present disclosure. For example, some embodiments of the present disclosure can enable a second NF to indicate a first NF (which sends a request to the second NF) how to send a subsequent request when a current request is rejected by the second NF. For example, the second NF may indicate the first NF that the context data (such as resource context or session context) has been taken over by the second NF or the second network entity is used for processing a subsequent request from the first NF. The first NF shall update the resource URI or session URI by replacing apiRoot using the apiRoot of the second NF, even when the current request is rejected by the second NF. Some embodiments of the present disclosure provide a mechanism to instruct a NF which performs a NF reselection to not do the NF reselection, which may reduce extra signaling for the further NF reselection. The embodiments herein are not limited to the features and advantages mentioned above. A person skilled in the art will recognize additional features and advantages upon reading the following detailed description.

Figure 9:
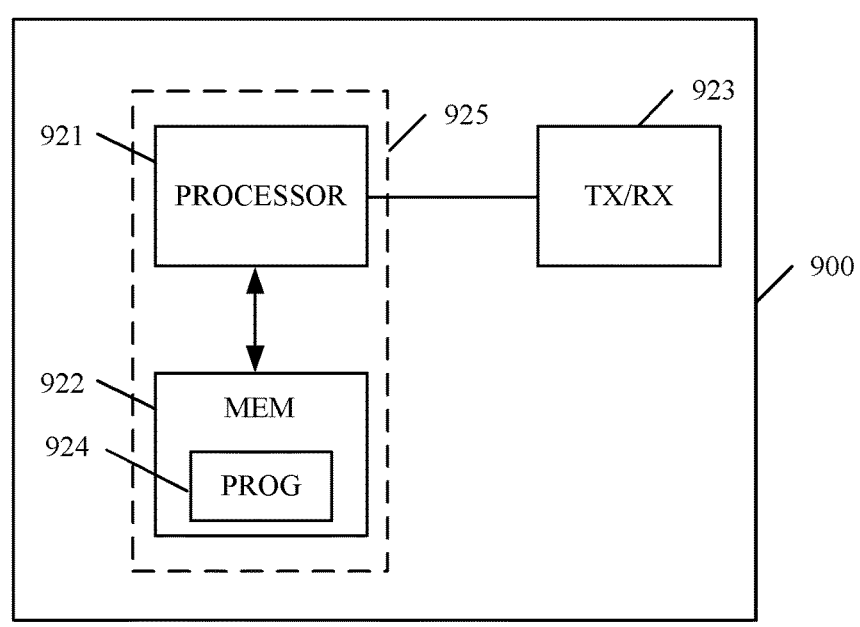
FIG. 9 is a block diagram showing an apparatus suitable for use in practicing some embodiments of the disclosure.

FIG. 9 is a block diagram showing an apparatus suitable for practicing some embodiments of the disclosure. For example, any one of the first network entity, the second network entity or the third network entity described above may be implemented as or through the apparatus 900.

The apparatus 900 comprises at least one processor 921, such as a digital processor (DP), and at least one memory (MEM) 922 coupled to the processor 921. The apparatus 900 may further comprise a transmitter TX and receiver RX 923 coupled to the processor 921. The MEM 922 stores a program (PROG) 924. The PROG 924 may include instructions that, when executed on the associated processor 921, enable the apparatus 900 to operate in accordance with the embodiments of the present disclosure. A combination of the at least one processor 921 and the at least one MEM 922 may form processing means 925 adapted to implement various embodiments of the present disclosure.

Various embodiments of the present disclosure may be implemented by computer program executable by one or more of the processor 921, software, firmware, hardware or in a combination thereof.

The MEM 922 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 921 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the first network entity, the memory 922 contains instructions executable by the processor 921, whereby the first network entity operates according to any of the methods related to the first network entity as described above.

In an embodiment where the apparatus is implemented as or at the second network entity, the memory 922 contains instructions executable by the processor 921, whereby the second network entity operates according to any of the methods related to the second network entity as described above.

In an embodiment where the apparatus is implemented as or at the third network entity, the memory 922 contains instructions executable by the processor 921, whereby the third network entity operates according to any of the methods related to the third network entity as described above.

Figure 10:
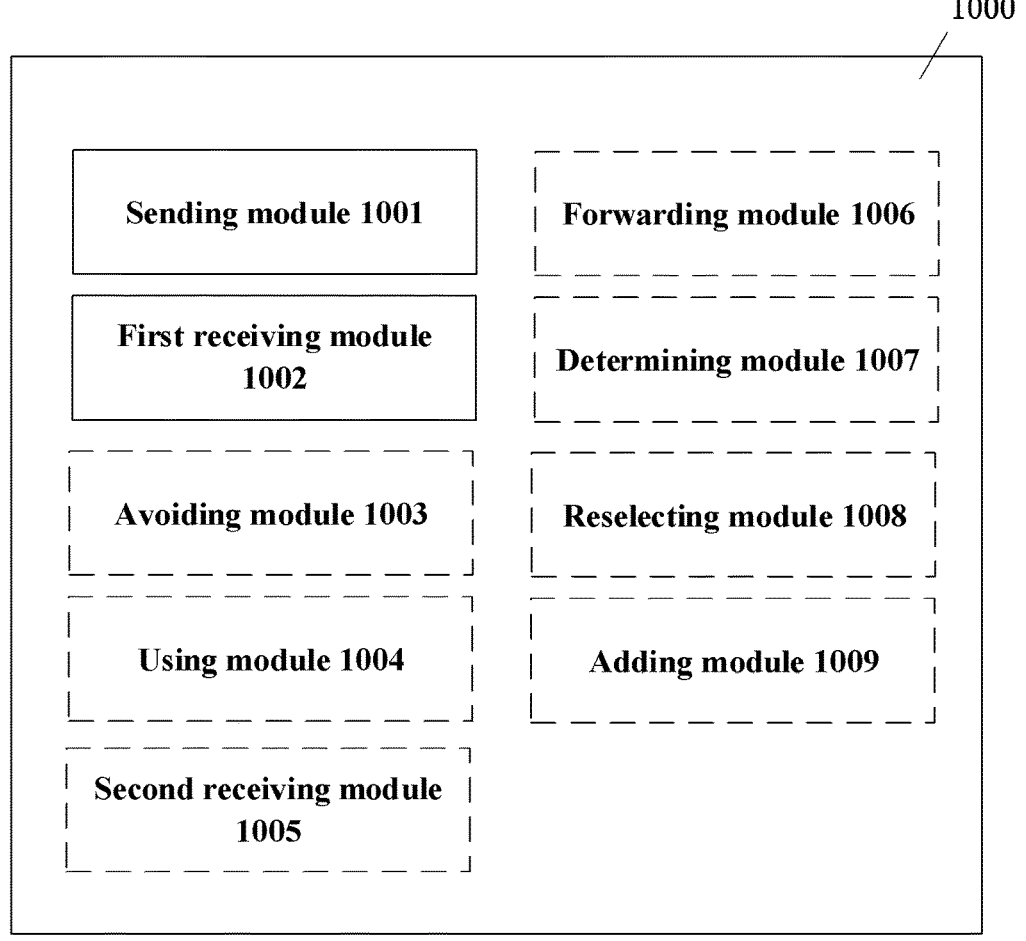
FIG. 10 is a block diagram showing a first network entity according to an embodiment of the disclosure.

FIG. 10 is a block diagram showing a first network entity according to an embodiment of the disclosure. As shown, the first network entity 1000 comprises a sending module 1001 configured to send a first request targeting resource context or session context to a second network entity. The first network entity 1000 further comprises a first receiving module 1002 configured to receive a first rejection response from the second network entity or an alternative second network entity. In an embodiment, the first rejection response includes information comprising a first parameter indicating whether the first request should be retried with the second network entity or to any other alternative second network entity and/or a second parameter indicating whether to use the alternative second network entity for a subsequent request targeting the same resource context or session context. The first rejection response including information comprising the second parameter is received from the alternative second network entity.

In an embodiment, the first rejection response comprises information indicating whether to avoid retry of the first request by reselection of the second network entity and/or indicating whether to use the second network entity for a subsequent request targeting the same resource context or session context.

In an embodiment, the first network entity 1000 further comprises an avoiding module 1003 configured to avoid retry of the first request when the first rejection response includes information comprising a first parameter and the first parameter indicates that the first request should be retried with the second network entity or to any other alternative second network entity.

In an embodiment, the avoiding module 1003 is configured to avoid retry of the first request by reselection of the second network entity, when the first rejection response comprises information indicating avoiding retry of the first request by reselection of the second network entity and/or indicating using the second network entity for a subsequent request targeting the same resource context or session context.

In an embodiment, the first network entity 1000 further comprises a using module 1004 configured to the alternative second network entity for a subsequent request targeting the same resource context or session context when the first rejection response includes information comprising a second parameter and the second parameter indicates using the alternative second network entity for a subsequent request targeting the same resource context or session context In an embodiment, the using module 1004 is configured to use the second network entity for a subsequent request targeting the same resource context or session context when the first rejection response comprises information indicating avoiding retry of the first request by reselection of the second network entity and/or indicating using the second network entity for a subsequent request targeting the same resource context or session context.

In an embodiment, the first network entity 1000 further comprises a second receiving module 1005 configured to receive a second request from a hyper text transfer protocol client. The sending module 1001 is configured to send the first request targeting the resource context or session context to the second network entity is in response to receiving the second request from the hyper text transfer protocol client.

In an embodiment, the first network entity 1000 further comprises a forwarding module 1006 configured to forward the first rejection response as a response for the second request to the hyper text transfer protocol client in response to receiving the first rejection response from the second network entity.

The first network entity 1000 further comprises a determining module 1007 configured to determine that said another second network entity is not reachable and/or said another second network entity cannot handle the second request.

The first network entity 1000 further comprises a reselecting module 1008 configured to reselect the second network entity based on the determination that said another second network entity is not reachable and/or said another network entity cannot handle the second request.

The first network entity 1000 further comprises an adding module 1009 configured to add the application program interface root of the second network entity or of the alternative second network when the first rejection response includes information comprising the second parameter and the second parameter indicates using the second network entity or an alternative second network entity for a subsequent request targeting the same resource context or session context work entity into the first rejection response.

In an embodiment, the adding module 1009 is configured to add the application program interface root of the second network entity into the first rejection response when the first rejection response comprises information indicating avoiding retry of the first request by reselection of the second network entity and/or indicating using the second network entity for a subsequent request targeting the same resource context or session context.

In an embodiment, the adding module 1009 is configured to add the application program interface root of another second network entity into the first rejection response when the first rejection response comprises information indicating retrying of the first request by reselection of the second network entity and/or indicating disabling the second network entity for a subsequent request targeting the same resource context or session context.

Figure 11:
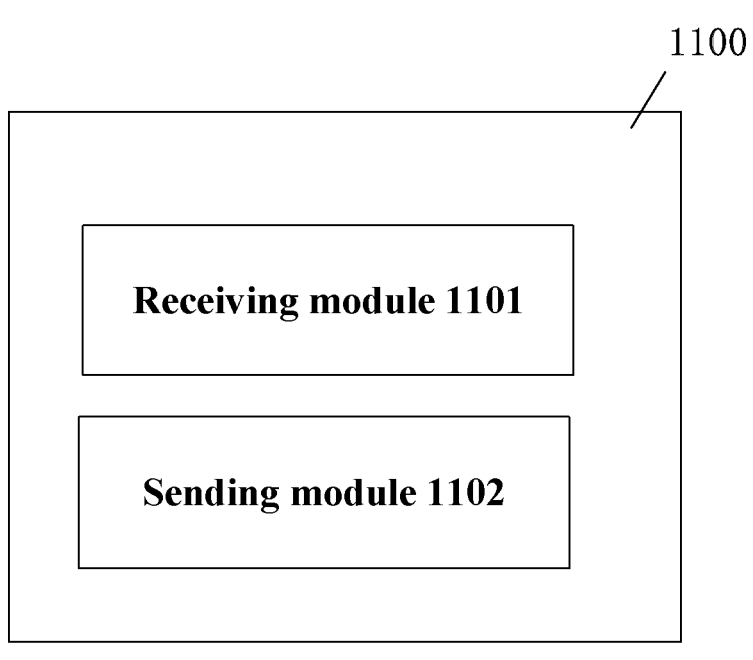
FIG. 11 is a block diagram showing a second network entity according to an embodiment of the disclosure.

FIG. 11 is a block diagram showing a second network entity or an alternative second network entity according to an embodiment of the disclosure. As shown, the second network entity or an alternative second network entity 1100 comprises a receiving module 1101 configured to receive a first request targeting a resource context or session context from a first network entity. The second network entity or an alternative second network entity 1100 further comprises a sending module 1102 configured to send a first rejection response to the first network entity. In an embodiment, the first rejection response includes information comprising a first parameter indicating whether the first request should be retried with the second network entity or to any other alternative second network entity and/or a second parameter indicating whether to use the alternative second network entity for a subsequent request targeting the same resource context or session context. The first rejection response including information comprising the second parameter is received from the alternative second network entity.

In an embodiment, the first rejection response comprises information indicating whether to avoid retry of the first request by reselection of the second network entity and/or indicating whether to use the second network entity for a subsequent request targeting the same resource context or session context.

Figure 12:
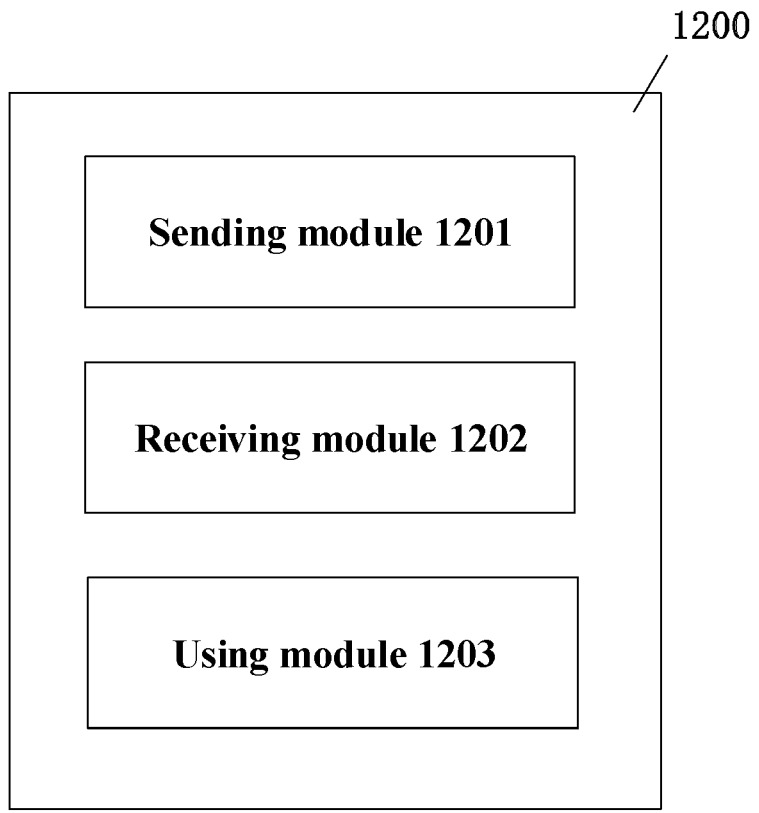
FIG. 12 is a block diagram showing a third network entity according to an embodiment of the disclosure.

FIG. 12 is a block diagram showing a third network entity according to an embodiment of the disclosure. As shown, the third network entity 1200 comprises a sending module 1201 configured to send a request targeting resource context or session context to a service communication proxy. The third network entity 1200 further comprises a receiving module 1202 configured to receive a rejection response from the service communication proxy.

In an embodiment, the rejection response includes information comprising a first parameter indicating whether the request should be retried with a second network entity or to any other alternative second network entity and/or a second parameter indicating whether to use an alternative second network entity for a subsequent request targeting the same resource context or session context. The rejection response including information comprising the second parameter is received from the alternative second network entity. In an embodiment, the rejection response comprises information indicating whether to avoid retry of the request by a reselection of a second network entity and/or whether to use the second network entity for a subsequent request. The third network entity 1200 further comprises a using module 1203 configured to use the alternative second network entity for a subsequent request targeting the same resource context or session context when the rejection response comprises information comprising the second parameter and the second parameter indicates using the alternative second network entity for a subsequent request targeting the same resource context or session context.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the first network entity, the second network entity or the third network entity may not need a fixed processor or memory, any computing resource and storage resource may be arranged from the first network entity, the second network entity or the third network entity in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a first network entity of a communication system, the method comprising:
sending, to a second network entity of the communication system, a first request targeting a resource context or a session context; and
receiving, from the second network entity or from an alternative second network entity of the communication system, a first rejection response that includes one or more of the following information:
a first parameter indicating whether the first request should be retried with any of the following: the second network entity, and any other alternative second network entities of the communication system; and
when the first rejection response is received from the alternative second network entity, a second parameter indicating whether to use the alternative second network entity for a subsequent request targeting the resource context or the session context.

2. The method of claim 1, wherein:
two or more of the following network entities are grouped into a network function set, a network function service set, or a network function service instance set: the second network entity, the alternative second network entity, and the other alternative second network entities; and
the grouped network entities are interchangeable and share the same resource context or session context.

3. The method of claim 1, wherein the information included in the first rejection response further indicates at least one of the following:
whether the first request is rejected due to application logic error or state confliction, and
whether the resource context or session context has been taken over by the alternative second network entity.

4. The method of claim 1, further comprising avoiding retry of the first request when the first parameter indicates that the first request should not be retried with the second network entity or with any other alternative second network entities.

5. The method of claim 1, further comprising using the alternative second network entity for a subsequent request targeting the same resource context or session context when the first rejection response is received from the alternative second network entity and the second parameter indicates to use the alternative second network entity for a subsequent request targeting the same resource context or session context.

6. The method of claim 1, wherein:
the first network entity is a hypertext transfer protocol client, the first rejection response is received from a hypertext transfer protocol server, which is the second network entity or the alternative second network entity, and
the hypertext transfer protocol client performs direct communication with the hypertext transfer protocol server without a service communication proxy.

7. The method of claim 1, wherein:
the first network entity is a service communication proxy;
the first rejection response is received from a hypertext transfer protocol server, which is the second network entity or the alternative second network entity; and
the method further comprises:
receiving from a hypertext transfer protocol client a second request targeting the resource context or the session context, wherein the first request is sent in response to receiving the second request; and
forwarding the received first rejection response to the hypertext transfer protocol client, as a response to the second request.

8. The method of claim 7, wherein the second request comprises the application program interface root of the second network entity.

9. The method of claim 7, wherein the second request comprises an application program interface root of another second network entity and the method further comprises:
reselecting the second network entity based on determining that said another second network entity is not reachable and/or cannot handle the second request; and
when the second parameter in the received first rejection response indicates to use the second network entity or an alternative second network entity for a subsequent request targeting the same resource context or session context, adding the application program interface root of the second network entity or of the alternative second network entity to the received first rejection response prior to forwarding to the hypertext transfer protocol client.

10. The method of claim 1, wherein the information comprises implicit information or explicit information.

11. The method of claim 1, wherein the information is carried by one of the following in the first rejection response: a 3gpp-Sbi-Target-apiRoot header, a 3gpp-Sbi-Binding header, or a newly defined hypertext transfer protocol header.

12. The method of claim 1, wherein the first request comprises an application program interface root of the second network entity.

13. A method performed by a second network entity or an alternative second network entity of a communication system, comprising:
receiving, from a first network entity of the communication system, a first request targeting a resource context or a session context; and
sending, to the first network entity, a first rejection response that includes one or more of the following information:
a first parameter indicating whether the first request should be retried with any of the following: the second network entity, and any other alternative second network entities of the communication system; and
when the first rejection response is sent by the alternative second network entity, a second parameter indicating whether to use the alternative second network entity for a subsequent request targeting the resource context or the session context.

14. The method of claim 13, wherein:

two or more of the following network entities are grouped into a network function set, a network function service set, or a network function service instance set: the second network entity, the alternative second network entity, and the other alternative second network entities; and the grouped network entities are interchangeable and share the same resource context or session context.

15. The method of claim 13, wherein the information included in the first rejection response further indicates at least one of the following:

whether the first request is rejected due to application logic error or state confliction, and whether the resource context or the session context has been taken over by the alternative second network entity.

16. The method of claim 13, wherein:

the method is performed by a hypertext transfer protocol server, which is the second network entity or the alternative second network entity; and one of the following applies:

the first network entity is a service communication proxy; or the first network entity is a hypertext transfer protocol client, and the hypertext transfer protocol server performs direct communication with the hypertext transfer protocol client without a service communication proxy.

17. The method of claim 13, wherein the information comprises implicit information or explicit information.

18. The method of claim 13, wherein the second parameter is an application program interface root, of the alternative second network entity, that can be used by the first network entity for a subsequent request targeting the resource context or the session context.

19. The method of claim 13, wherein the first request includes an application program interface root of the second network entity.

20. The method of claim 13, wherein the first rejection response includes an application program interface root of the second network entity or of the alternative second network entity.

21. A first network entity configured to operate in a communication system, the first network entity comprising:

a processor; and a memory coupled to the processor, said memory containing instructions executable by said processor, whereby said first network entity is operative to:

send, to a second network entity of the communication system, a first request targeting a resource context or a session context; and receive, from the second network entity or from an alternative second network entity of the communication system, a first rejection response that includes one or more of the following information:

a first parameter indicating whether the first request should be retried with any of the following: the second network entity, and any other alternative second network entities of the communication system; and when the first rejection response is received from the alternative second network entity, a second parameter indicating whether to use the alternative second network entity for a subsequent request targeting the resource context or the session context.

* * * * *